US008073822B2

(12) United States Patent
Sell et al.

(10) Patent No.: US 8,073,822 B2
(45) Date of Patent: Dec. 6, 2011

(54) METHOD AND APPARATUS FOR MANAGING ELECTRONIC MESSAGES

(75) Inventors: Jörg-Stefan Sell, Eching (DE); Christian Winter, Altfraunhofen (DE); Franz Heiβ, Hohenthann (DE)

(73) Assignee: Open Text Software GmbH, Hamburg (DE)

( * ) Notice: Subject to any disclaimer, the term of this patent is extended or adjusted under 35 U.S.C. 154(b) by 353 days.

(21) Appl. No.: 11/145,496

(22) Filed: Jun. 2, 2005

(65) Prior Publication Data
US 2005/0283461 A1 Dec. 22, 2005

(30) Foreign Application Priority Data
Jun. 2, 2004 (EP) .................................... 04013014

(51) Int. Cl.
*G06F 7/00* (2006.01)
(52) U.S. Cl. ...................................................... 707/692
(58) Field of Classification Search .................. 707/101, 707/102, 204, 104, 692, 999.101
See application file for complete search history.

(56) References Cited

U.S. PATENT DOCUMENTS

| | | | | |
|---|---|---|---|---|
| 1,035,690 | A * | 8/1912 | Corley | 28/237 |
| 5,781,901 | A * | 7/1998 | Kuzma | 707/10 |
| 5,903,723 | A * | 5/1999 | Beck et al. | 709/200 |
| 5,940,823 | A * | 8/1999 | Schreiber et al. | 707/3 |
| 5,999,967 | A * | 12/1999 | Sundsted | 709/206 |
| 6,009,462 | A * | 12/1999 | Birrell et al. | 709/206 |
| 6,014,689 | A * | 1/2000 | Budge et al. | 709/206 |
| 6,073,133 | A * | 6/2000 | Chrabaszcz | 707/10 |
| 6,076,101 | A * | 6/2000 | Kamakura et al. | 709/206 |
| 6,108,690 | A * | 8/2000 | Sakamoto | 709/206 |
| 6,857,074 | B2 * | 2/2005 | Bobo, II | 713/168 |
| 6,898,622 | B1 * | 5/2005 | Malik | 709/206 |
| 6,915,333 | B2 * | 7/2005 | Delia et al. | 709/206 |
| 7,039,678 | B1 * | 5/2006 | Halahmi et al. | 709/206 |
| 7,047,248 | B1 * | 5/2006 | Tycast | 707/102 |
| 7,080,099 | B2 * | 7/2006 | Tada et al. | 707/104.1 |
| 7,117,210 | B2 * | 10/2006 | DeSalvo | 707/10 |
| 7,120,800 | B2 * | 10/2006 | Ginter et al. | 713/193 |
| 7,191,219 | B2 * | 3/2007 | Udell et al. | 709/206 |
| 7,209,953 | B2 * | 4/2007 | Brooks | 709/206 |
| 7,231,427 | B1 * | 6/2007 | Du | 709/206 |
| 2001/0054073 | A1 * | 12/2001 | Ruppert et al. | 709/206 |

(Continued)

FOREIGN PATENT DOCUMENTS
EP   1 035 690   9/2000

OTHER PUBLICATIONS
European Search Report for Priority Application EPO 04013014.8.

*Primary Examiner* — Kimberly Lovel
*Assistant Examiner* — Mohammad R Uddin
(74) *Attorney, Agent, or Firm* — Sprinkle IP Law Group

(57) ABSTRACT

A method is provided for the storage-efficient management of electronic messages, wherein a message that is to be managed is first received, the message is decomposed into a basic structure and file attachments contained in the message, a unique identification value is calculated for each file attachment, the file attachment is stored as a file with a respective identification value for which no file exists in the storage, or a reference counter of the file attachment for whose identification value a file already exists in the storage, is incremented, and the basic structure with references to the files in the storage, which references correspond to the file attachments originally contained in the message, is stored.

22 Claims, 10 Drawing Sheets

U.S. PATENT DOCUMENTS

| | | | |
|---|---|---|---|
| 2002/0059384 A1* | 5/2002 | Kaars | 709/206 |
| 2002/0065892 A1* | 5/2002 | Malik | 709/206 |
| 2004/0064733 A1* | 4/2004 | Gong | 713/201 |
| 2005/0005164 A1* | 1/2005 | Syiek et al. | 713/201 |
| 2005/0055359 A1* | 3/2005 | Kawai et al. | 707/100 |
| 2006/0031340 A1* | 2/2006 | Mathew et al. | 709/206 |
| 2006/0112165 A9* | 5/2006 | Tomkow et al. | 709/206 |
| 2009/0100073 A1* | 4/2009 | Dargahi et al. | 707/100 |

* cited by examiner

METHOD AND APPARATUS FOR MANAGING ELECTRONIC MESSAGES

CROSS-REFERENCE TO RELATED APPLICATION

This application claims a benefit of priority under 35 U.S.C. §119(a) to European Patent Application No. 04013014.8 filed Jun. 2, 2004 by inventor Franz Heiss, et al. entitled "Method and Device for Managing Electronic Messages," the entire contents of which are hereby expressly incorporated by reference for all purposes.

FIELD OF THE INVENTION

The present invention relates to a method and an apparatus for managing electronic messages. More specifically, the invention relates to the storage-efficient archiving of electronic messages which contain attachments.

DESCRIPTION OF THE PRIOR ART

Program systems for processing electronic messages such as, for example, e-mails or other message formats for sending text, image, sound or other data are known in the art. In such cases, electronic messages are sent between data processing systems of different users who are connected to one another via, for example, a computer or communications network. In these cases, messages can be sent either within a local network only, such as, for example, a company intranet, or worldwide, via the Internet, and therefore between any users having a computer connected to the Internet. The standard protocol for exchanging e-mails according to the RFC822 Protocol is described in Crocker, D. H.: "Standard for the Format of ARPA Internet Text Messages", RFC822, 1982.

In this case, the electronic messages are usually sent, transmitted, forwarded and distributed by electronic message systems, which frequently also assume the function of storing the messages. Such message processing systems for sending, receiving and storing e-mails, such as, for example, Microsoft Exchange or Lotus Notes, are known in the art and can be installed on a single computer on a so-called e-mail server for a plurality of clients in a network.

Electronic messages are thus both exchanged between e-mail servers, as e-mail processing systems, and sent between clients, via an e-mail server. A known standard for sending and receiving electronic messages or electronic post ("e-mail") between a client and an e-mail server is POP3 ("Post Office Protocol Version 3"), which enables the client to contact the e-mail server, extract e-mails from their mailbox, and download new e-mails into the client's local inbox, or to send to the e-mail server, for forwarding, e-mails that are to be sent from the client's local outbox. A further standard, which is known as "Internet Message Access Protocol Version 4 revision 1", (IMAP4rev1), differs from the POP3 standard in that messages can be read directly on the e-mail server without the need for downloading to the client.

Electronic messages such as, for example, e-mails, typically contain a message header containing information about the receiver, the sender and other information, as well as a message body, which contains the actual message. This message body can contain files in usual formats, as well as further e-mails which, in turn, can contain files, contained as so-called file attachments. Due to the capability of known e-mail processing systems to provide an auto-response or forwarding function, in which a message is generated in response to a received message, in which the received message is automatically copied into the body of the response message, there ensues the problem of cascading messages which, due to repeated use of the auto-response function, become ever larger and thus increasingly constitute a storage problem. Since each electronic message is a single file and, as such, is stored individually, electronic messages can also be swapped-out of the e-mail processing system in their entirety only, and stored externally.

The problem is rendered more acute by the fact that present-day e-mail processing systems provide so-called post distribution lists (mailing lists such as, for example, public mailing lists or distribution lists), through which an electronic message is sent automatically to all recipients included in the list, with the result that an e-mail having an identical content is sent to, for example, a thousand people, and stored individually for the recipient on the basis of each recipient's own meta data such as, for example, recipient's address, time of receipt, etc., and consequently may also be redundantly present, in multiples, on the respective e-mail server or a respective message storage system.

However, even if a sender wishes to send an electronic message to several recipients simultaneously, these several recipients can be simply entered as addressees in the message header, in the "to" or "copy" (or "cc") fields, whereupon the message is sent automatically to all the recipients entered, and stored separately, with the inclusion of any file attachments, for each recipient.

Since electronic messages more and more frequently contain ever larger file attachments, there are being stored on the e-mail server electronic messages which contain multiply identical file attachments, with the result that the storage problem is being rendered yet more acute.

Hitherto, the greater storage requirement of e-mail servers associated with this has been met only to an inadequate degree, for example, by swapping-out the managed e-mails into a separate archive system at regular intervals. In this connection, however, the necessary transferring results in a greater amount of administration, particularly when older messages have to be re-read and first transferred back to the e-mail server from the archive system. The .pst files generated by, for example, the Microsoft Outlook archiving function, are voluminous and instable, resulting in additional support problems and increasing costs for the securing of file servers.

Since, through the swapping-out of messages into an archiving system, the electronic messages are again stored in their entirety on a separate file or archive server, data is again saved redundantly in respect of the multiply identical file attachments, thus generating high storage costs.

The European patent application EP-A-1 035 690 presents an e-mail archiving system in which electronic messages are stored in a message archive with a client identifier and an archive token, in order to provide for selective, structured access to archived messages. In this case, however, the presented archive system does not propose any solution regarding the prevention of redundant storage of identical file attachments in a multiplicity of stored messages.

Accordingly, there is a need for methods and systems in which the disadvantages of the prior art are overcome or at least reduced and which, in particular, enable the storage requirement to be reduced in the management, storage and/or archiving of electronic messages.

SUMMARY OF THE INVENTION

The present invention relates to a method and system for managing electronic messages which obviates or mitigates at least one disadvantage of the prior art.

According to a first aspect of the present invention, there is provided a method for the storage-efficient management of electronic messages which includes, firstly, the receiving or reading of a message that is to be managed by a system such as, for example, an e-mail server. The message to be managed is analysed and thereby decomposed into a basic structure and the file attachments contained in the messages. A unique identification value is calculated for each file attachment, and the file attachments of the decomposed message are then each stored individually, a check first being performed to determine whether a file relating to an identification value already exists in the storage. If no file having the newly calculated identification value exists in the storage, the new file is stored with its identification value. If a file having the calculated identification value already exists in the storage, the file is not stored over again, and instead only a reference to the already existing identical file is entered. The remaining basic structure comprising the message header now no longer contains any file attachments, but only references to the file attachments stored as separate files, and is also stored as such, or as a core file of the message.

The decomposition of the electronic message into its constituents, such as basic structure and file attachments, enables the redundancy to be substantially reduced in the storage of electronic messages, in that each constituent, such as a file attachment, is stored only once and the remaining basic structure of the message contains only references to the file attachments contained in the original message. The unique identification value calculated for each file attachment enables the file attachments to be uniquely identified and managed, this identification value being stored either with the file or separately from the latter, for example, in an assignment table.

According to another aspect of the present invention, there is provided a system for the storage-efficient management of electronic messages which includes an archive server comprising a message swapping-out module, an identification value calculation module and a reference counter management module. The message swapping-out module divides a message received on the server into the basic structure of the message and the file attachments contained in the message. The basic structure, with references to the file attachments contained in the message, is thereupon stored separately in a storage. The file attachments are transferred to the archive server and the identification value calculation module calculates a unique identification value for each file attachment and, if this identification value has not previously been allocated, the file attachment is stored in the storage with the calculated identification value, otherwise, if a file having the calculated identification value already exists in the storage, the file attachment is not stored over again, but instead the reference counter management module increments the reference counter of the existing file.

The message client according to still another aspect of the present invention, which is connected to the system for storage-efficient management of electronic messages, comprises a processor, a storage, a display screen, at least one input device, and a message client module which enables a user, by means of the input device in combination with a processor, to call up messages from the message server in a user interface (GUI) of the message client module, display them on the screen and store them on the archive server in a storage-efficient manner.

According to another aspect of the present invention, e-mails are managed as electronic messages by a system, particularly an archive server, program modules installed on the archive server being used to read incoming e-mails, analyse them for their constituents and separate out file attachments. According to a further aspect of the invention, in this case file attachments which, in turn, are an electronic message or otherwise, in turn, contain file attachments, are likewise analysed and file attachments possibly contained in them are separated out. The analysing and separating-out are in this case performed recursively until all constituents of an electronic message are separated out. The electronic message which exists at first as a file having, for example, the suffix .eml or .msg, is therefore divided into a basic structure, or core file, containing references to the messages or file attachments assigned to it, and the corresponding previously contained messages and file attachments, contained messages likewise being divided into a basic structure and the respectively contained file attachments. The file attachments, having been separated out, are then transferred to a storage system.

Preferably in this case, the file attachments are transferred individually to the storage system and, upon input of a file attachment into the storage system, the identification value calculation module calculates a unique identification value for each transferred file attachment and assigns this identification value to the file attachment. In addition, the system checks whether a newly calculated identification value already exists. For this, according to an aspect of the invention, all identification values of file attachments already stored in the system are stored in an assignment table or identification value databank. Since the identification value for a file attachment transferred to the storage or archive system or to the archive server already exists in the identification value databank, the file attachment is not stored over again as a file on the archive server, but instead only a reference to the corresponding, already existing file, is stored.

According to a further aspect of the present invention, an electronic message managed by means of the system is subsequently accessed in that, firstly, the core file or basic structure comprising references is read by a program module, and the contained references to the separately stored files are replaced by these files and stored, in turn, as file attachments within the core file, so that the original message is restored.

A further aspect of the present invention relates to the reconstruction of electronic messages which have been previously managed and archived through decomposition into their constituents and separate storage of these constituents, and the reconstruction of messages which exist in a format suitable for reconstruction according to the method described here. Firstly, the basic structure of the message is read, the files to which the references in the basic structure refer, on the basis of the identification values stored in the references, are retrieved from the storage, and the references are replaced by the files as the file attachments of the message to be reconstructed.

According to still a further aspect of the present invention, each time that a reference in a basic structure is replaced by the corresponding file in the reconstruction of an electronic message, the reference counter management module only decrements the reference counter of this file when the message is deleted from the system. If a message is only reconstructed because, for example, it is to be displayed, the corresponding reference counter is not decremented and, upon completion of display, the message is also expediently not stored over again in the system. When the reference counter of a file reaches a value less than its initialisation value, the file is deleted from the archive server, so that file attachments of messages which are no longer managed by the system are also removed again from the archive server.

BRIEF DESCRIPTION OF THE DRAWINGS

Further advantageous embodiments and aspects of the present invention are disclosed by the figures described in the following, the subsequently described exemplary embodiments and the appended claims. The exemplary embodiments are explained with reference to the appended drawings.

FIG. 1 shows, exemplarily, a block diagram of a distributed data processing system in which a system according to the present invention can be implemented.

DETAILED DESCRIPTION

Figure 1:
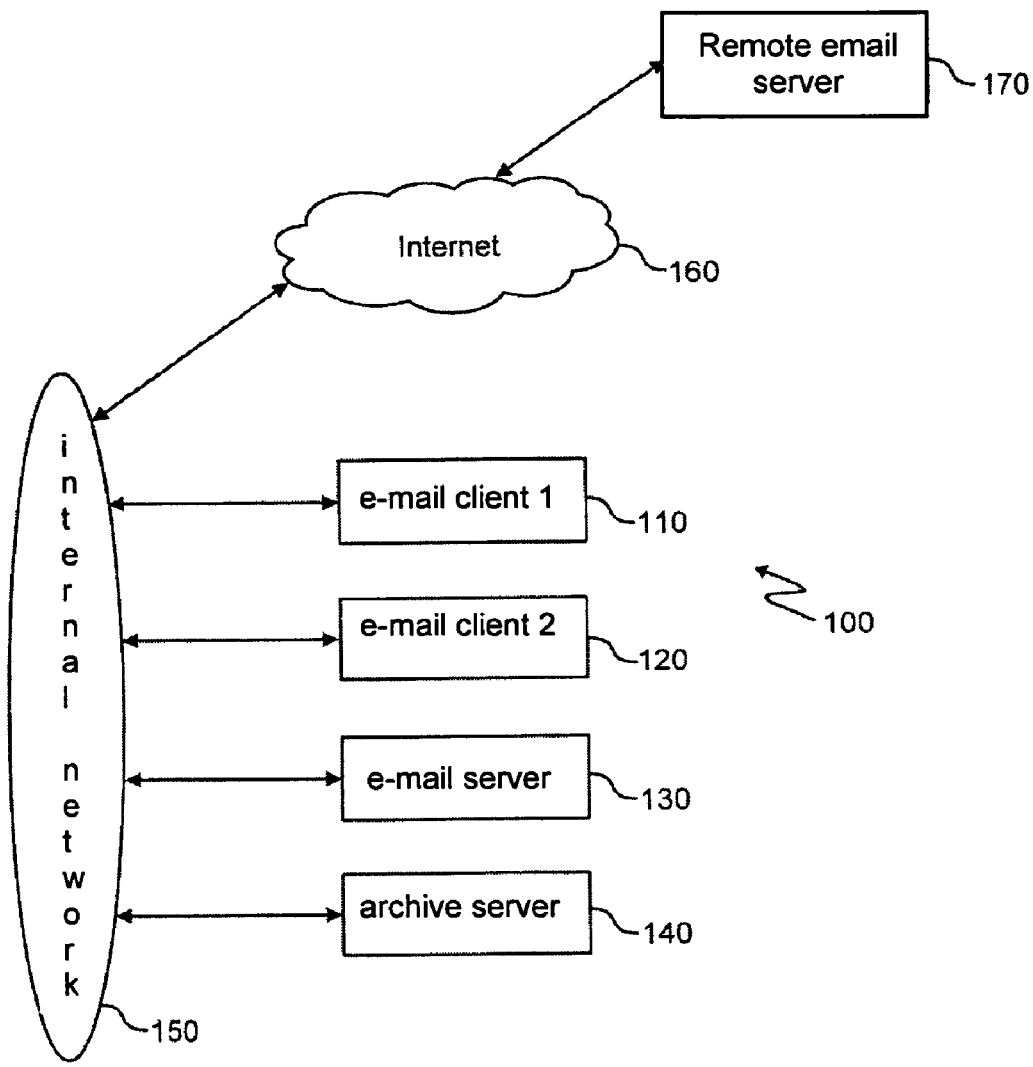

The described methods and systems for the storage-efficient management of electronic messages have obvious advantages. Files which previously could not be accessed separately as file attachments in messages can now be separated out from the messages and managed and stored separately, it being possible to reassemble the original message at any time.

The storage requirement for storing electronic messages is substantially reduced, in that individual file attachments are now stored only once, since the identification value makes it easy to ascertain whether the file attachment is already stored in the system, so that further instances of the file need not be stored again. Instead, reference is made to the already existing instance.

According to an exemplary embodiment of the present invention, the identification value is generated as a hash value, using a so-called hash algorithm. For example, the Java programming language provides for this purpose the "hashCode ( )" method, which generates a hash value of the specified file. Alternatively, instead of a hash algorithm, other algorithms such as, for example, checksumming algorithms (CRC) can be used to ascertain the uniqueness of a file attachment. It is preferred, in this connection, to use algorithms which determine the uniqueness of the files not only on the basis of the file name, but on the basis of all the data records of the files, since electronic messages are often sent with file attachments which have identical file names or which differ only slightly, for example, as different versions of a document, but which are to be stored in the system as different files.

A further advantage of the present invention relates to the possibility of using the presented methods for finer structuring of electronic messages or other files which, in turn, contain files, in that the respective messages or files can be recursively decomposed into their individual constituents. It is thus possible, for example in searching for certain character strings in the messages managed by the server, to assign search engine matches of these character strings to individual file attachments, and to display these selectively, instead of displaying only the message or entire file, which might contain many attachments, as a match.

The resolution and assembling, according to the present invention, of electronic messages, and the separating-out, according to the invention, of file attachments contained in electronic messages are advantageously performed using program modules which are integrated into the server system, for example, the e-mail server, and which make use of its functionality, so that the functionality provided by the invention may be easily added to existing systems.

In addition, the invention renders possible a situation in which the available individual constituents of an electronic message are in each case stored once only in the archive system, in that duplicates can be identified on the basis of the same identification value, thereby preventing multiple storage.

According to another exemplary embodiment of the present invention, the text constituent remaining in the basic structure or core file is also swapped-out as a separate file and stored, as a uniquely identifiable file, on the archive server, so that the basic structure or core file then consists only of the message header and references, and consequently of at least the reference to the file comprising the text body of the message. Thus, all data of a core file or basic structure, including the references to the decomposed file attachments, can be held in a swapped-out data structure, for example, in an external databank or in objects in the storage of the archive server.

Due to the provided methods and systems according to aspects of the present invention, the administration of an e-mail server is simplified considerably, and is also more cost-effective. The reference files which remain on a message or e-mail server and refer to the basic structures of the messages are then typically only about 0.2 to 1 KB in size, so that even mailboxes with a relatively small storage capacity can manage a large number of messages. In addition, it becomes possible for substantially more mailboxes to be stored on an e-mail server, enabling savings to be made in respect of hardware and software. The importing of backups, the restoration of data and migration to new e-mail servers also become simpler and more cost-effective.

Furthermore, the present invention is advantageous for the secure archiving of documents, particularly since legal requirements are increasingly applied to retention times and archiving standards for electronic documents and, according to various regulations (SEC Rules, GoBSm GDPdU or the Sarbanes-Oxley Act), the latter are made legally equivalent to paper documents. Through the present invention, electronic messages can be stored more simply, in a non-redundant manner and with statistical information in, for example, non-erasable formats. In this connection, statistical evaluations in respect of the use of certain documents can be easily derived through evaluation of the reference counters for individual file attachments.

According to a further exemplary embodiment of the present invention, it is possible to dispense with reconstruction of the message if, for example, the message is further processed by the system as a group of files referenced to one another.

According to further aspects of the present invention, there are provided a computer program and an electronic storage medium.

FIG. 1 shows, in schematic form, a block diagram of a distributed data processing system 100 which is suitable for implementation of embodiments of the invention. In the data processing system 100, message clients (email client 1, e-mail client 2) 110, 120, a message server (email server) 130 and an archive server 140 are connected to one another via an internal network (intranet) 150. The internal network 150 in this case can be realized as a LAN, WLAN or other communications network which enables messages, e.g. in the form of data packets, to be exchanged between the servers and clients. In practice, not just two clients will be connected to the servers via the network, but rather a much greater number, for example, corresponding to the number of employees in a company, will be connected via the network to the servers and the respectively other clients, in order to exchange electronic messages via the network by means of the e-mail server, including the sending, management and receipt of messages.

According to FIG. 1, there is also a corresponding data exchange with remote users who are connected to the internal network 150, via the Internet 160, through a remote e-mail server 170.

Figure 2:
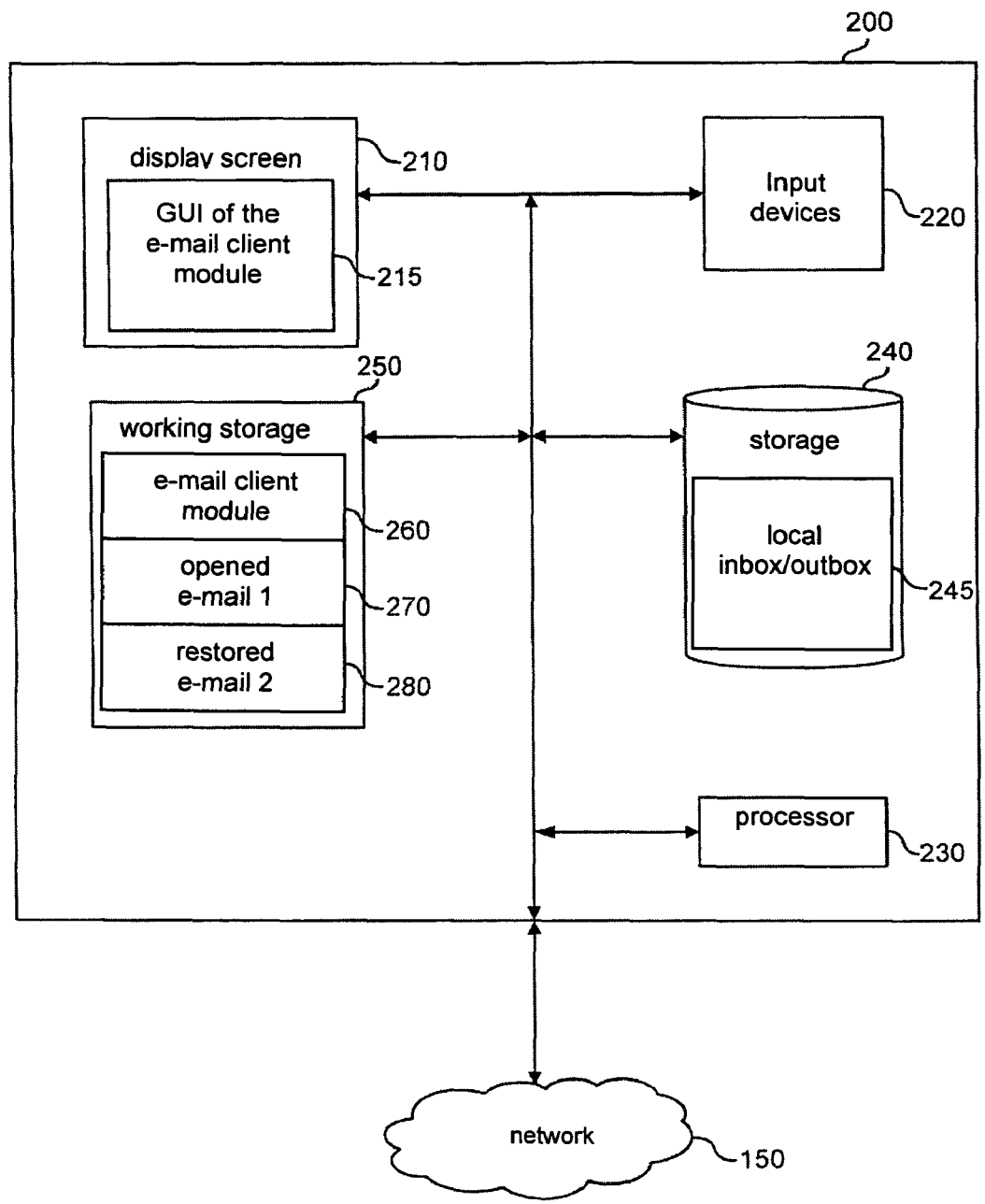
FIG. 2 is a block diagram of a message client according to the present invention.

FIG. 2 shows, in schematic form, a detailed block diagram 200 of a message client 110, 120 connected to the network 150. The message client 200 in this case is usually a computer, terminal or, also, a so-called thin client. When equipped as a computer, it has a processor 230, a display screen 210, at least one input device 220, preferably a storage 240 and a working storage 250. Stored in the working storage 250, for the purpose of sending, processing and receiving electronic messages such as, for example, e-mails, is an executable e-mail client module whose user interface (GUI=graphical user interface) 215 is displayed on the screen 210 and, with the aid of the processor 230, enables the electronic messages to be processed locally. According to an embodiment of the invention, there is stored in the storage 240 a local inbox/outbox (mailbox) 245 which is used, in particular, when there is a message exchange with the e-mail server 130 according to the POP3 standard.

In the working storage 250 there are also, by way of example, an e-mail 270 which has been received and opened, and a reconstructed or restored e-mail 280, each of which can be displayed in the GUI 215.

Figure 3:
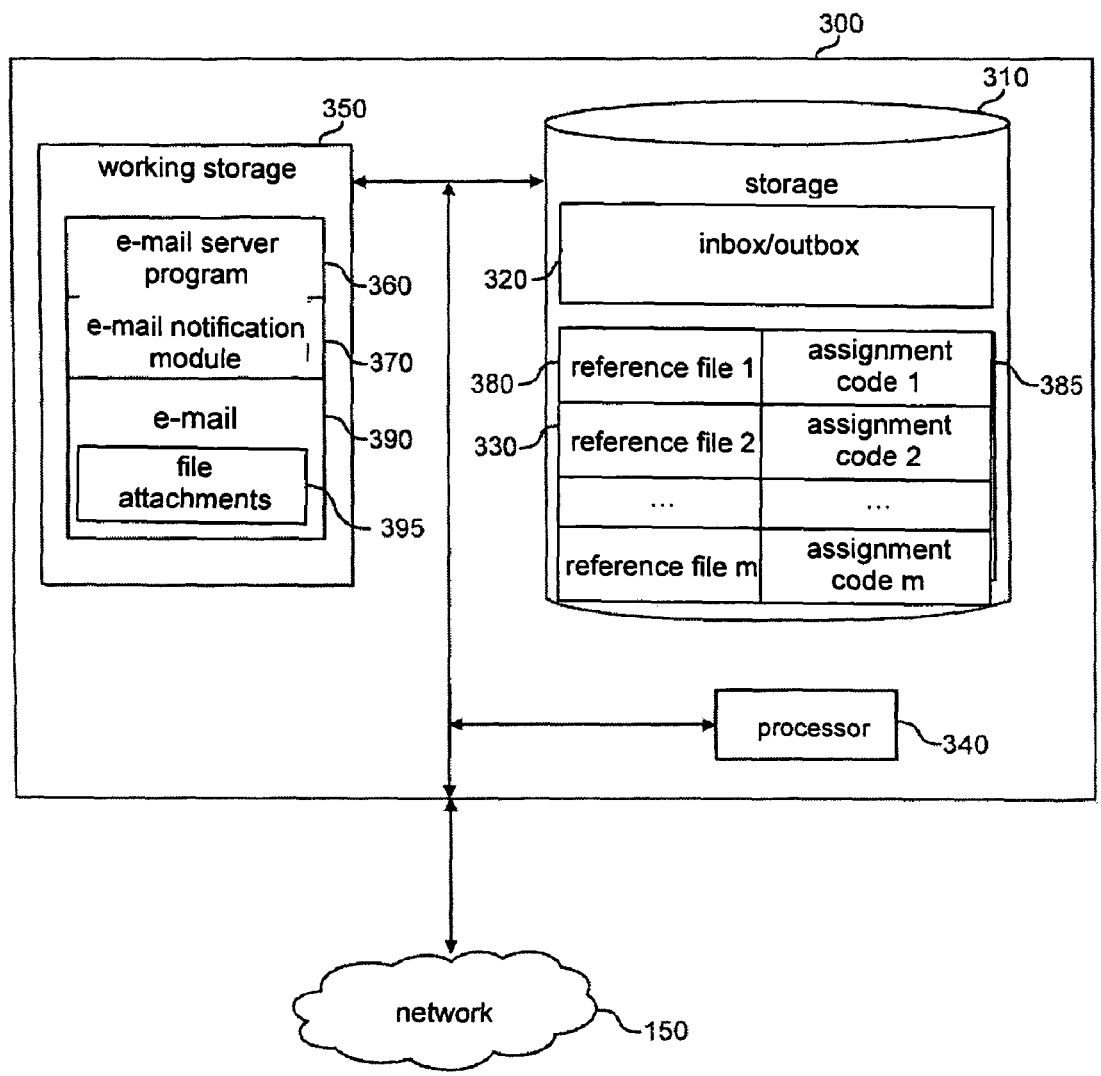
FIG. 3 is a block diagram of a message server according to the present invention.

FIG. 3 shows, in schematic form, a detailed block diagram 300 of the e-mail server 130, which is connected to the network 150. The e-mail server 300 has a storage or a databank 310 for storing the electronic messages, to be managed by the e-mail server, in the inbox/outbox (mailbox) 320, and has a processor 340 and a working storage 350. Stored in the working storage, so as to be at least partially executable, is an e-mail server program (email management program) such as, for example, Microsoft Exchange or Lotus Notes, which manages the electronic messages by means of the processor 340. The working storage 350 also has an e-mail notification module 370. In addition, FIG. 3 shows, by way of example, a message (email) 390 that is currently to be managed, with file attachments 395.

Figure 4:
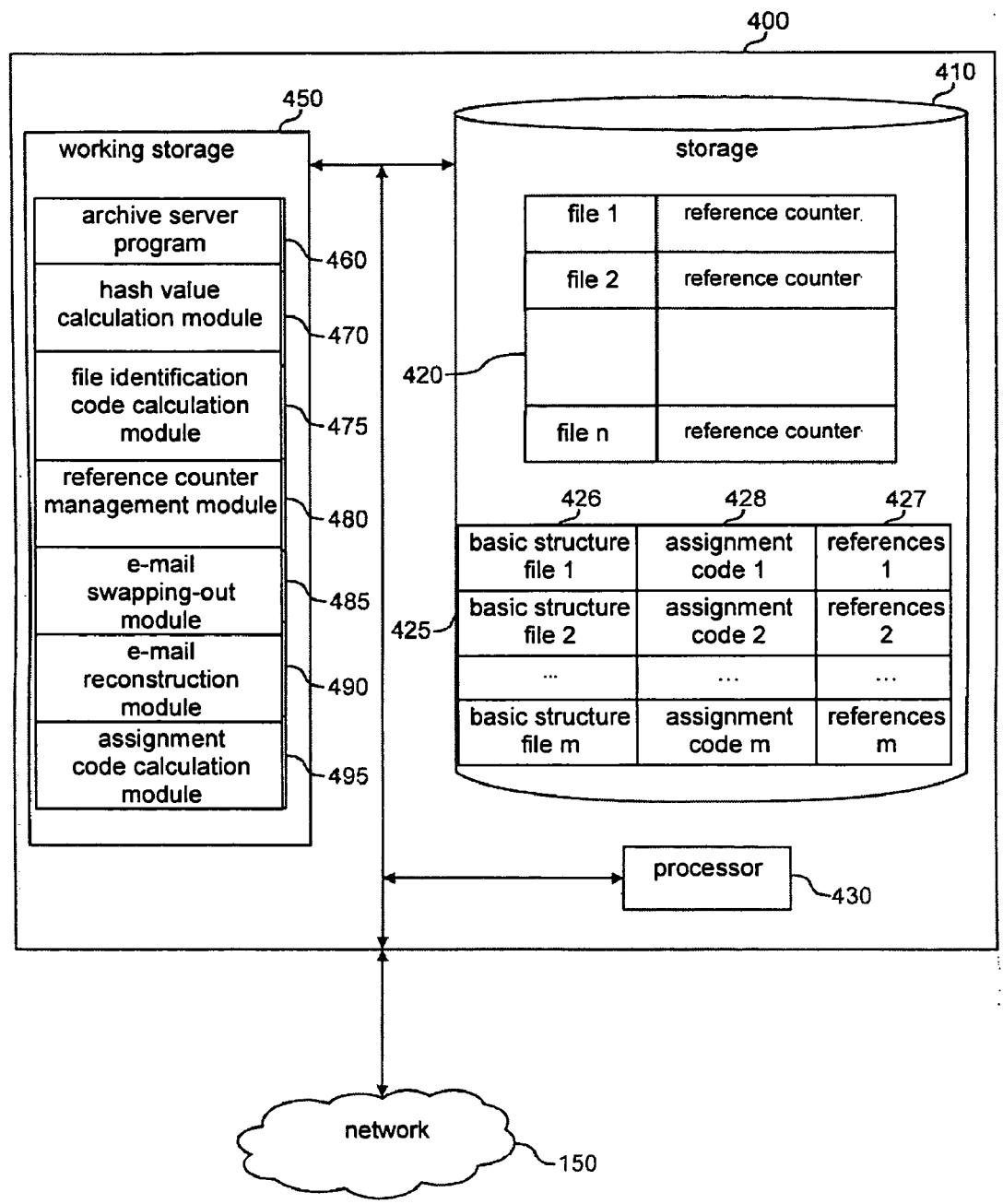
FIG. 4 is a block diagram of an archive server according to the present invention.

FIG. 4 shows, in schematic form, a detailed block diagram 400 of the archive server 140, which is connected to the network 150 and, likewise, has a processor 430, a storage or a databank 410 for storing and archiving electronic messages, and a working storage 450 in which are stored, by way of example, at least portions of an executable archive server program 460, as well as an identification value calculation module (hash value calculation module) 470, a reference counter management module 480, an e-mail swapping-out module 485, an e-mail reconstruction module 490, and an assignment code calculation module 495. The respective modules are preferably only loaded into the storage when their functionality is required.

Figure 7:
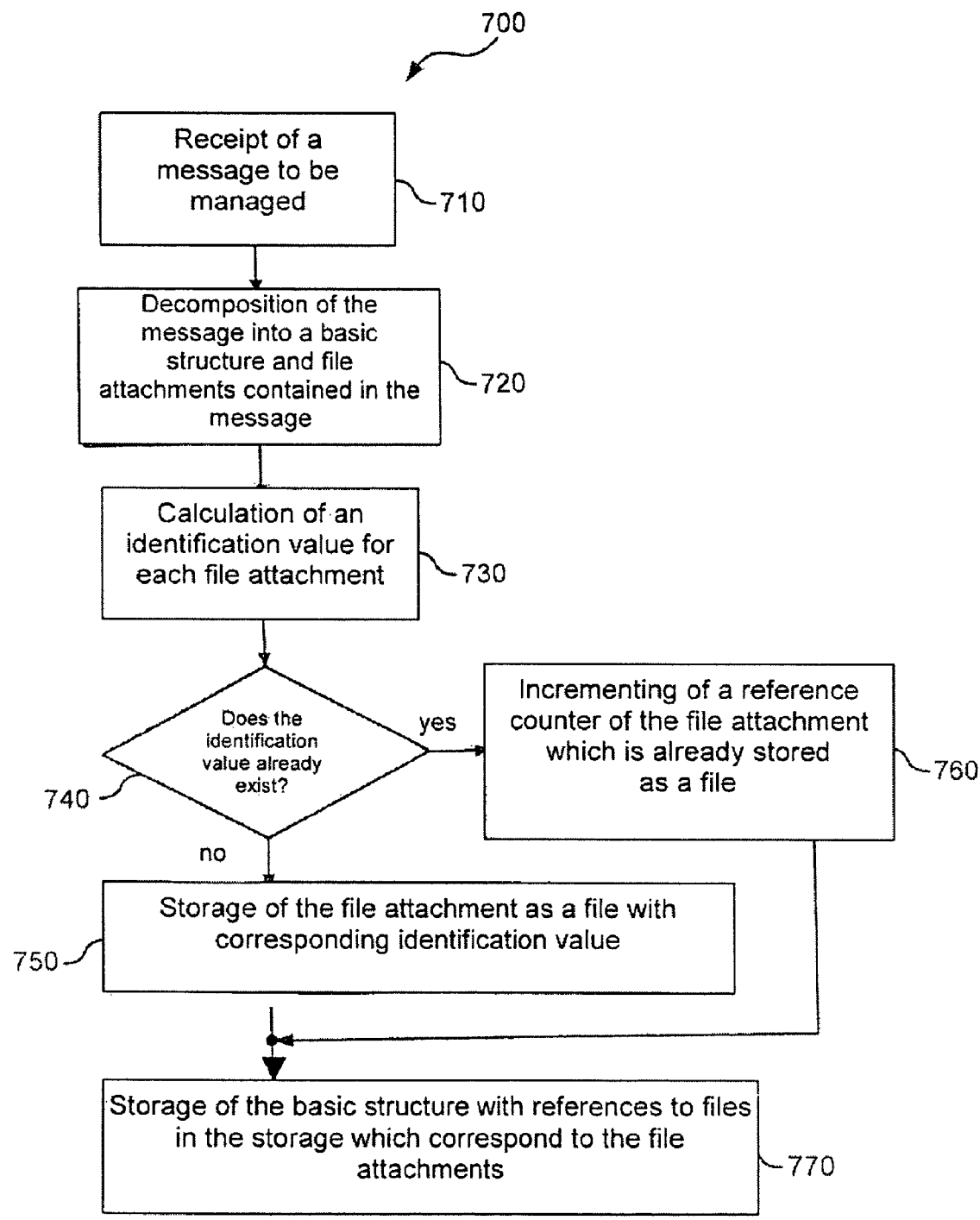
FIG. 7 is a flow diagram of a method according to an embodiment according to the present invention.

A method for the storage-efficient management of electronic messages is now explained with reference to FIG. 7, which shows a flow diagram of a method according to the present invention.

Essentially, the method 700 for the storage-efficient management of electronic messages (emails) operates as explained in the following. A message 270 that is to be managed, for example opened in the client 200, is to be managed and archived in a storage-efficient manner through user inputs via the input device 220. A storage-efficient management can also be performed without user input or interaction of a client 200, for example, through stored rules and automatic cyclic checking of the server. The e-mail is read by the e-mail server, or sent to and received by the latter (step 710), and then stored as an e-mail 390 in the working storage 350. The e-mail notification module 370 informs the archive server 400 of the existence of an e-mail to be managed. The e-mail swapping-out module 485 thereupon causes the e-mail to be transferred to the archive server, and decomposes the message into its basic structure and the file attachments contained in the message (step 720). The basic structure in this case preferably corresponds to the core file of the e-mail, comprising the message header and the text immediately in the message header. The files separated out from the e-mail, which had previously been contained in the e-mail as file attachments 385, are now transferred, preferably individually, into a storage system. The storage system in this case is preferably a storage 410 of the archive server, or a separate file server. For each file attachment, the hash value calculation module 470 calculates a unique hash value as an identification value for this file attachment (step 730). Next, a check is performed in step 740 to determine whether such an identification value already exists in the storage 410 and, consequently, whether an identical file has already been stored by the archive server. If this is not the case, the operation branches to step 750, and the file attachment is stored for the first time, as a file, in the storage of the archive server. If an identical identification value already exists, the operation branches to step 760, in which only the reference counter management module 480 increments the reference counter of the file attachment by the identical identification value without, however, again storing the file attachment as a file on the archive server. According to an exemplary embodiment, the storage 410 in this case includes an assignment table 420, in which there is assigned to each stored file a corresponding reference counter whose value indicates how frequently in managed e-mails reference is made to the file as a file attachment. The value of the reference counter can therefore be evaluated statistically in order, in the simplest case, to indicate how frequently a certain file is contained as a file attachment in the managed e-mails.

After all file attachments that have been separated out from the e-mail have been processed by the archive server program 460 and its modules, the remaining basic structure of the e-mail, comprising the references to the files in the storage system 410, which correspond to the original file attachments, is likewise stored, as a basic structure file 426 with reference 427, in the storage of the archive server.

According to a preferred embodiment, no modules of the archive server are installed on the e-mail server 300 since, in order to preserve the stability of the e-mail server, there should be no additional modules on the latter. In order to implement the e-mail notification module 370, therefore, use is made of corresponding functionalities of the e-mail server program 360, in order to notify and regularly check for the receipt of new e-mails.

Figure 8:
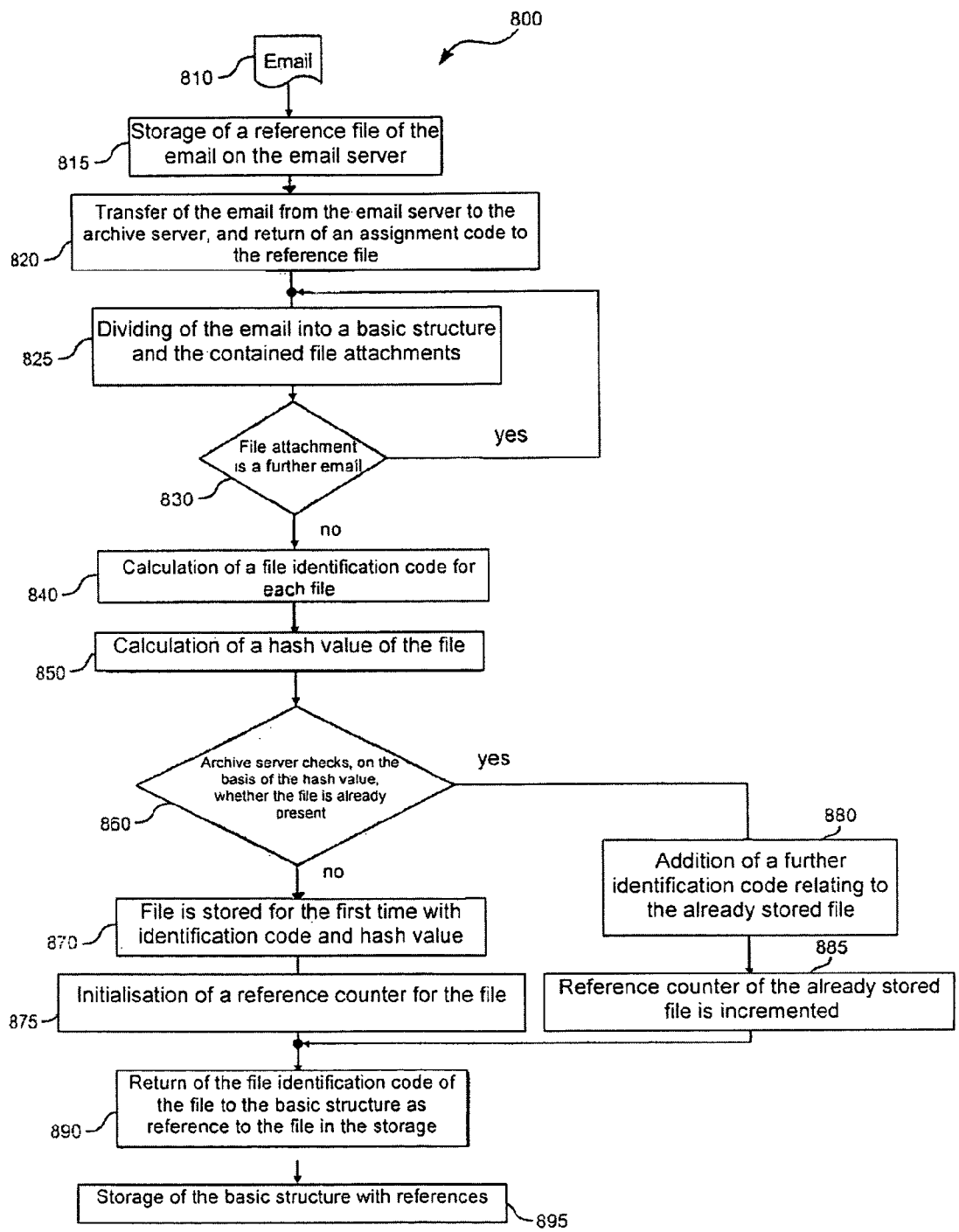
FIG. 8 is a flow diagram of a method according to a further embodiment of the invention.

A detailed flow diagram of a method 800 for the storage-efficient management of e-mails is represented in FIG. 8, and is now to be explained with further reference to FIGS. 5a to 5c and 6.

Figure 5A:
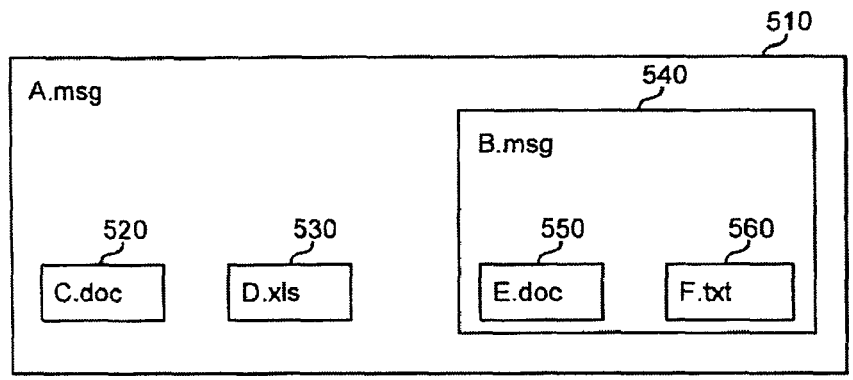
FIG. 5a illustrates, in schematic form, an electronic message which contains both file attachments and a further electronic message which, in turn, contains file attachments.
Figure 5B:
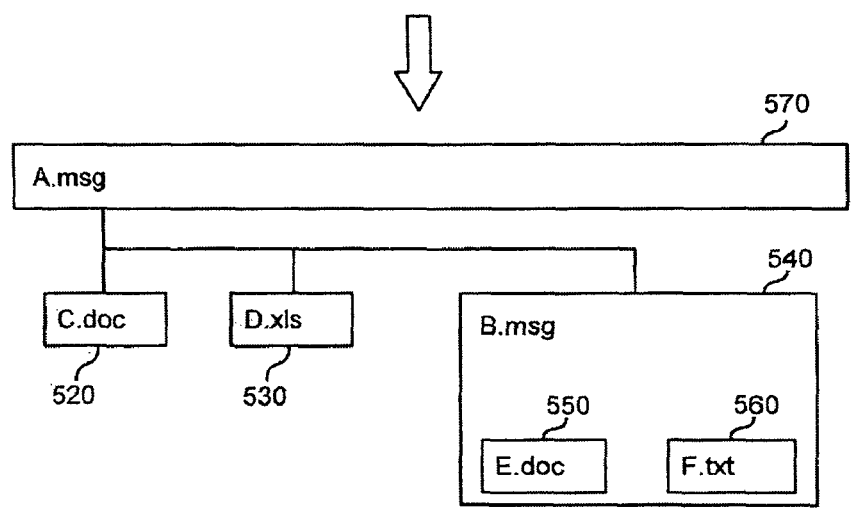
FIG. 5b illustrates, in schematic form, the message from FIG. 5a, from which both the file attachments and the message that is contained in turn have been separated out.
Figure 5C:
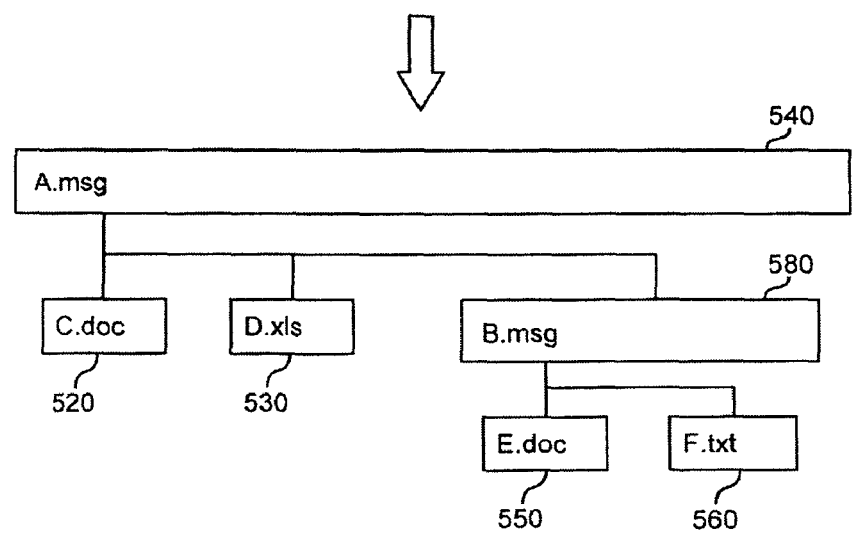
FIG. 5c illustrates, in schematic form, the electronic message from FIGS. 5a and 5b, in which the file attachments have likewise been separated out from the separated-out message.

The starting point, in step 810, is an e-mail A.msg 510, which contains both several file attachments (Word document C.doc and Excel file D.xls) 520, 530 and a further e-mail (B.msg) 540 which, in turn, contains file attachments (Word document E.doc and text document F.txt) 550, 560 (FIG. 5a). After the e-mail notification module 370 has signalled to the archive server program 460 that there is present on the e-mail server an e-mail 510 that is to be managed, this e-mail is replaced by a reference file 380 which now contains information such as the addressee, sender, subject, etc. of the e-mail to be managed. In a subsequent step 820, the e-mail is now transferred to the archive server 400. In step 825, the e-mail 510 is now divided up, by the e-mail swapping-out module 485, into a basic structure 570, the file attachments C.doc 520, D.xls 530 and the separated-out e-mail B.msg 540 (FIG. 5b). In a subsequent step 830, a check is performed to determine whether at least one of the separated-out file attachments, in turn, is an e-mail comprising possibly further file attachments. In the present case, such a further e-mail is present as a file attachment, namely, the file B.msg 540, so that from step 830 the operation branches back to step 825 and, step 825 being executed again, the e-mail B.msg is also divided up into a basic structure 580 and the file attachments E.doc 550 and F.txt 560 (FIG. 5c ). Upon checking again in step 830, it is ascertained that there is no further e-mail present as a file attachment, so that the operation branches to step 840. In step 840, a respective file identification code 695, which enables the corresponding file attachments to be assigned to the basic structure, is now calculated for the file attachments 520, 530, 550 and 560. The file identification code is preferably a reference code of the separated-out file, generated by a file identification calculation module 475, so as to be unique on a worldwide basis, from parameters such as the file name, ID of the network card used, computer hardware, time of archiving, etc.

According to an exemplary embodiment, the assignment code 385 for reference to the basic structure file from the reference file is also a worldwide unique reference code which is generated, for example, according to the file identification code.

In a subsequent step 850, the hash value calculation module 470 uses, for example, the hash code( ) method to calculate a hash value for each of the files 520, 530, 550 and 560. In a subsequent step 860, the archive server program 460 or another module uses the calculated hash value to check whether the file is already present in the archive server or its storage 410. If the file is not yet present in the archive server, the operation branches to step 870 and the file is stored for the first time on the archive server or a suitable storage or file server, with its hash value and its file identification code. In addition, in step 875, the reference counter management module 480 initialises a reference counter for the newly stored file with a start value.

However, if the result of the check is that there is already a file that has been transferred to the archive server, the operation branches to step 880, in which only the newly calculated file identification code for the already stored file is added and the reference counter of this file is incremented in step 885, but the file is not stored over again on the archive server or its storage. Thereafter, in step 890, the respective file identification code of the file is returned to the basic structure as a reference to the file. The basic structure 426, with the references 427, is then likewise stored on the archive server or an appropriate storage 410. Furthermore, the assignment code 385 of the reference file, corresponding to the basic structure, on the e-mail server is supplemented by parameters, generated by an assignment code calculation module 495, which refer to the stored basic structure file. The assignment code 385 is in this case likewise entered in the basic structure for subsequent assignment, as entry 428.

Figure 6:
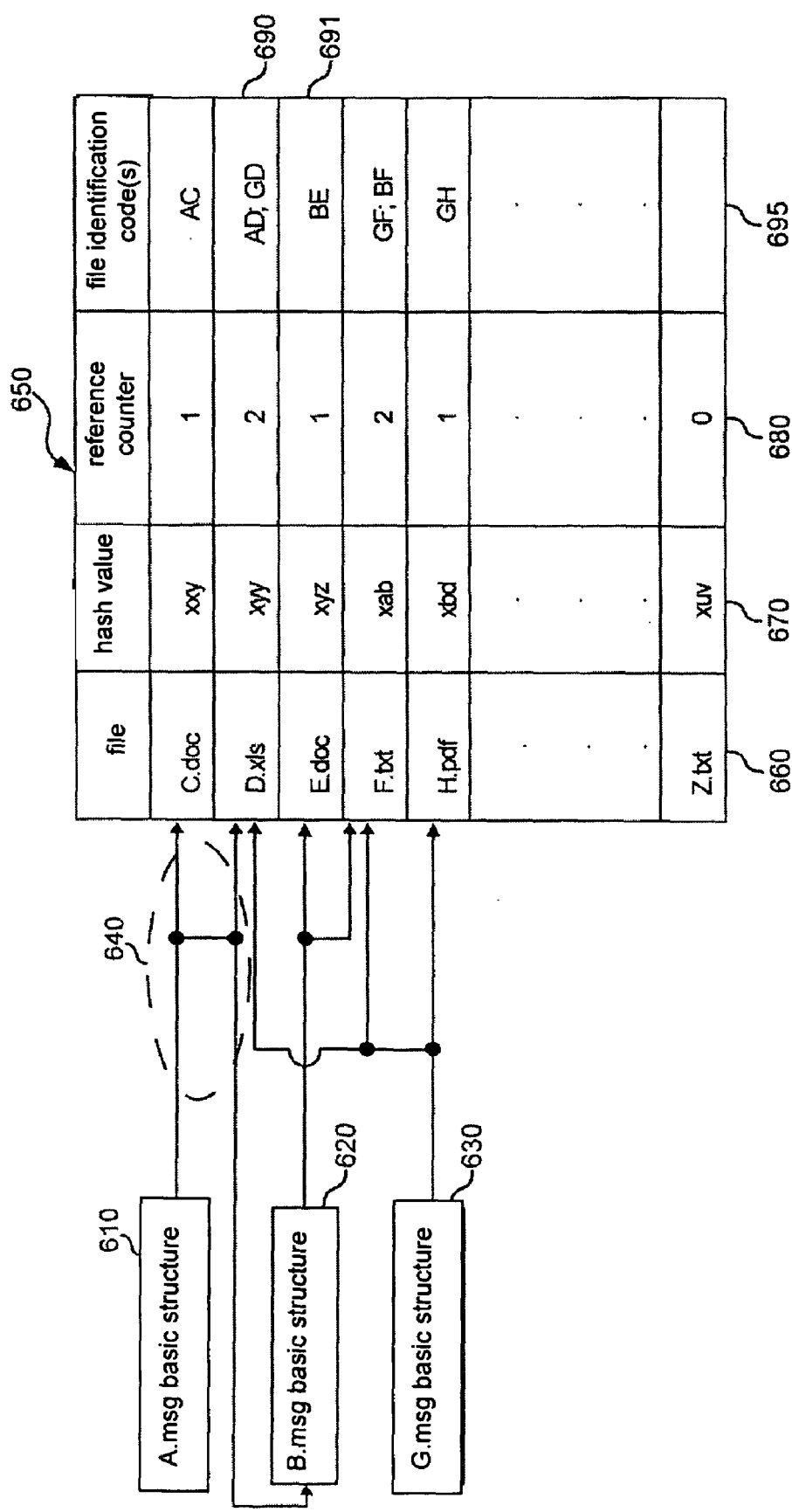
FIG. 6 illustrates, in schematic form, message basic structures and their references to the separated-out files, including their identification value and preference counter.

Accordingly, data structures such as those represented in FIG. 6 are produced when the method according to the invention is executed. For the e-mail A.msg known from FIGS. 5a to 5c and the e-mail B.msg contained within it, a respective basic structure 610 and 620 of the e-mails is stored in the storage of the archive server or in a separately stored databank. Additionally stored in the archive server are files according to the table 650 which, for example, in a first column 660 lists, as a file in each case, the file attachments present in the e-mails A.msg and B.msg, in a second column 670 shows the associated hash value, in a third column 680 specifies the respective value of the reference counter for the files and, in a further column 695, lists the file identification codes. Following swapping-out of the e-mail A.msg, the A.msg basic structure 610 is now stored, with the references 640 and assignment code, as a file or data record in, for example, a table 425 on the archive server. Additionally stored in the archive server, or in a separately stored databank, in an assignment table 420 (data record in column 690), is the file D.xls, referenced in the references through the file identification codes "AD" and "GD", together with the hash value and the reference counter value "2". The reference counter value "2" indicates that the file D.xls is again referenced by a further swapped-out e-mail (G.msg, through the file identification code "GD"), whose basic structure 630 is represented in FIG. 6. Table 650 furthermore shows a file Z.txt whose reference counter value is zero and which is consequently deleted when the storage or databank is next updated, or it is deleted by an automatic delete routine. The overall result is that each file is only ever stored once on the archive server and, as soon as a file is no longer referenced by swapped-out e-mails managed in the system, it is deleted again from the archive server. Thus, if several messages have been stored with their constituents or attachments, there is an n:m relationship between the basic structures of the messages and the messages and file attachments separated out from the messages.

Figure 9:
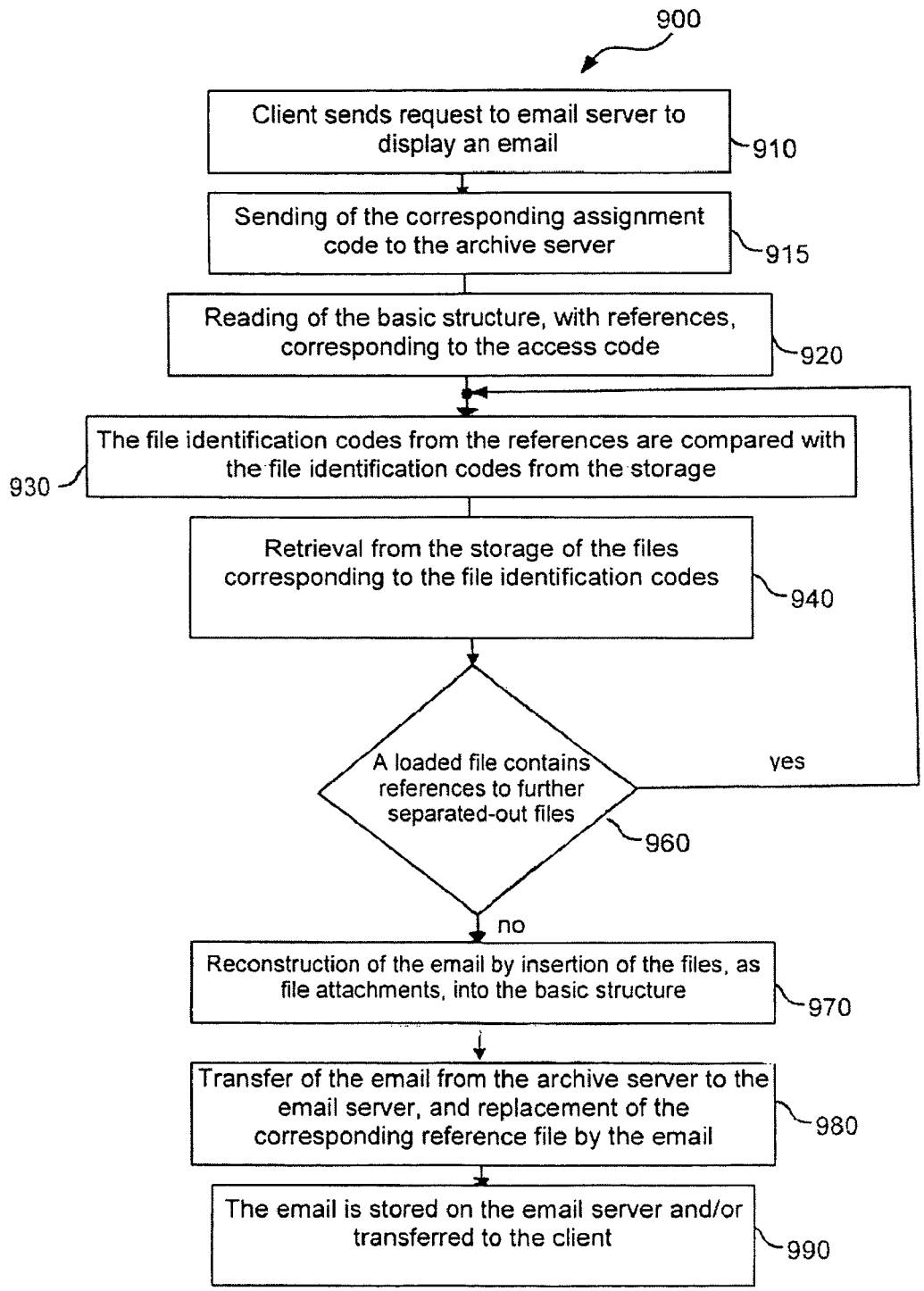
FIG. 9 is a flow diagram of a method according to a further embodiment of the invention.

The reconstruction of a swapped-out e-mail is described with reference to FIG. 9, which shows a flow diagram of a method 900 for reconstructing electronic messages.

To reconstruct an archived e-mail, a user starts, for example, a call-up to display their e-mail. According to an embodiment of the invention, for the user this call-up does not differ from the usual call-up of an e-mail. For this, the user, in the user interface (GUI) 215 on the display screen 210, by means of the input device 220 on the message client 200, selects a message which they wish to have displayed, and selects the display e-mail function, e.g. by double-clicking on the message or selecting the "display" selection area in, for example, a pull-down menu of the GUI of the e-mail client module 260. Thereupon, in step 910, the client sends a corresponding request to the e-mail server 300 to display the selected e-mail. The e-mail server thereupon, in the reference file 380 corresponding to the e-mail, reads the assignment code 385 out of the storage 310. In a subsequent step 915, the assignment code is sent to the archive server. On the archive server 400, the e-mail corresponding to the assignment code is then reconstructed by the e-mail reconstruction module 490. For this, the basic structure corresponding to the assignment code is first read out of the storage, in step 920. In this case, the files to which reference is made in the references associated with the corresponding basic structure file are then loaded, and the references are replaced by the loaded files, so that an e-mail file with contained file attachments is again constituted.

According to a preferred embodiment, for this, in a step 930, the file identification values contained in the references are first compared with the file identification values stored in column 695 in the assignment table 650. If they match, the corresponding file specified in column 660 of the table is retrieved out of the storage 410 (step 940). Thus, if the file identification code "BE" has been transferred out of the basic structure of the e-mail "B.msg", the e-mail reconstruction module 490 determines the file "E.doc" in row 691 with the identical file identification value "BE".

In step 960 a check is then performed to determine whether a loaded file contains further references to likewise separated-out and archived files. This applies both to further separated-out file attachments and to references to further basic structure files stored on the archive server. If a loaded file, in turn, contains references, the operation branches back to step 930 and the reference, in turn, is resolved according to the previously described steps 930 and 940, by loading the corresponding file. In the example of the previously described e-mail A.msg 510, the corresponding references 640 of the A.msg basic structure 610 contain a reference to the B.msg basic structure file 620. According to an exemplary embodiment, this basic structure file is likewise swapped-out to the archive server. The references of the B.msg basic structure file 620 are thereupon likewise resolved, in that the files referenced by the file identification codes in the references are loaded. When all references in the referenced files have been recursively resolved, the operation branches from step 960 to step 970, and the e-mail is reconstructed in full by the insertion of all loaded files, as file attachments, in the basic structure file(s).

In step 980, the fully reconstructed e-mail is then transferred from the archive server to the e-mail server. The reference file, which corresponds to the e-mail according to a matching assignment code and serves as a place-holder, is then replaced by the e-mail. In step 990, the e-mail is either stored in the storage of the e-mail server 300, transferred to the e-mail client 200, or otherwise processed.

According to an exemplary embodiment, it is also possible that the user, through appropriate inputs, for example, via a selection menu, might wish to reconstruct only certain file attachments in an e-mail, e.g. for storage space reasons, and selects these file attachments in the selection menu. The e-mail reconstruction module 490 then only replaces the references with the corresponding files that have been selected by the user. The remaining references are not resolved and appear in the reconstructed e-mail as place-holders for the corresponding file attachments. In a further, preferred selection step, the user can then likewise resolve these hitherto unresolved references and have them replaced by the corresponding file attachments.

In step 980, the fully or partially reconstructed e-mail would be stored as an e-mail file on the e-mail server, for example, in the inbox/outbox (mailbox) 320, and is thus available for calling-up by the e-mail client 200. According to an embodiment, the reconstructed e-mail is not stored first in the mailbox 320 of the e-mail server, but transferred directly to the calling-up e-mail client 200 and stored there in the local inbox/outbox (mailbox) 245.

Figure 10:
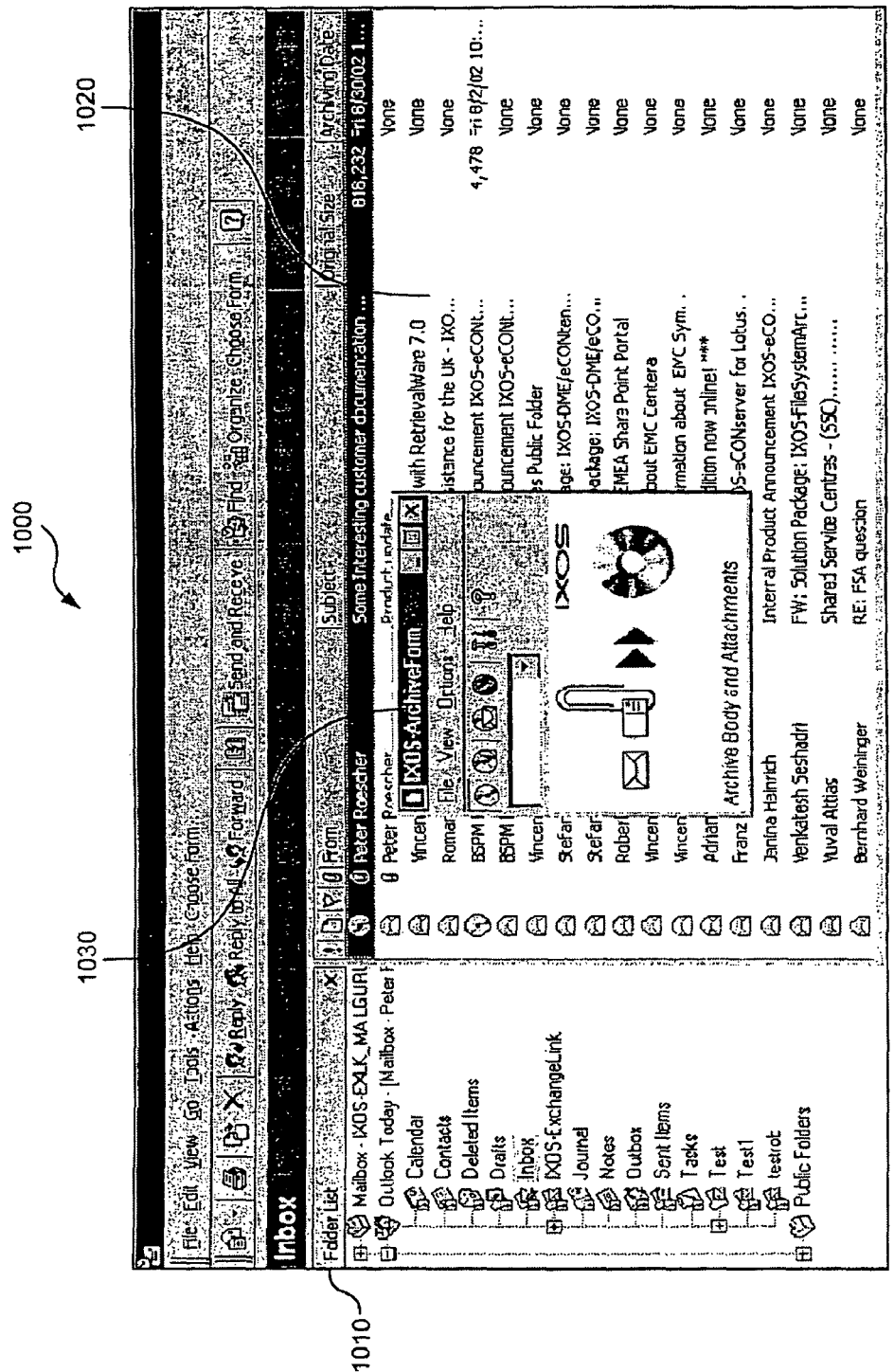
FIG. 10 shows a graphical user interface of a message client module in connection with an embodiment of the invention.

FIG. 10 shows, exemplarily, a portion of a graphical user interface 1000 of an e-mail client module 260 according to the invention, displayed on the screen 210. Listed in the folder list 1010 is the inbox, opened in the window 1020, with the e-mails stored, for example, on the archive server, such as, for example, the topmost e-mail from "Peter Roescher" having the subject "Some interesting customer documentation . . . ". The inbox 1020 window therefore lists both non-archived and archived e-mails. Non-archived e-mails are in this case identified by the envelope symbol known from the e-mail management program used, such as, for example, Microsoft Outlook, whereas, according to the invention, archived e-mails are identified by a CD symbol. The archiving of file attachments is visually represented to the user in an additional archive window 1030. Furthermore, all function selections for archiving and subsequently reconstructing e-mails can be controlled by the user, via the graphical user interface.

The e-mails transferred in step 980 from the archive server to the e-mail server are preferably first buffered, as e-mail 390 with file attachments 395, in the working storage 350.

Following the transfer of the reconstructed or restored e-mail, the latter is then preferably transferred, as e-mail 280, from the working storage 350 into the working storage 250 of the e-mail client, to be subsequently stored, e.g. in the local inbox/outbox, for further processing.

If, according to an exemplary embodiment, an archived e-mail is deleted by the entry of a corresponding user input, a corresponding command, together with the assignment code contained in the reference file corresponding to the e-mail, is forwarded from the e-mail server to the archive server via, for example, the e-mail notification module 370. In the archive server, the basic structure having an identical assignment code is read, and the reference counter of all files referenced by a file identification code in the basic structure file is decremented. If, in this case, a reference counter reaches the value "0", the file and, if necessary, the corresponding data record in the assignment table 650 is deleted. The basic structure file is then likewise deleted, and a corresponding message is returned to the e-mail server, whereupon the reference file is also deleted.

According to an exemplary embodiment, the e-mail is divided or resolved into the basic structure and the contained file attachments in that the e-mail file is first opened and the contained data records are read. During reading, the data records are parsed, on the basis of typical file structures or the known file suffixes, for the presence of file attachments. Upon identification of files contained in the e-mail file, these files are separated out, and thus stored outside the e-mail file, and the file in the e-mail file is replaced by a reference to the swapped-out file. Once all files contained in the e-mail file have been recursively resolved, i.e., replaced by references, the result is a reference tree which contains, as nodes or leaves of the tree, all swapped-out files which were originally present within the e-mail file as file attachments, possibly with further attachments, and which are now contained as references to the files. Subsequently, after the file identification code has been calculated for each file, the references are supplemented by this file identification code, so that the swapped-out files are uniquely assigned during reconstruction. The remaining e-mail file with references is likewise stored as a basic structure of the e-mail.

According to preferred embodiments of the present invention, the methods and systems described here for the storage-efficient management of electronic messages are implemented on data processing equipment suitable for same, such as, for example, computers organized, for example, in a client-server environment.

All appropriate combinations of features described above are to be considered as belonging to the invention, even if they have not been explicitly described in their combination.

Having described and illustrated the principles of the present invention in embodiments thereof, it should be apparent to those of skill in the art that the present invention may be modified in arrangement and detail without departing from such principles. Many changes and modifications within the scope of the present invention may be made without departing from the spirit thereof, and the present invention includes all such changes and modifications.

What is claimed is:

1. A method for the storage-efficient management of electronic messages, comprising:
   in a system comprising an email server and an archive server, receiving a first email message at the archive server from the email server;
   decomposing at the archive server the first email message into a first basic structure and file attachments attached to the first email message;
   selecting a file attachment attached to the first email message;
   determining if the selected file attachment is an additional email message containing further file attachments;
   if the selected file attachment is an email message containing further file attachments, decomposing the selected file attachment into an additional basic structure for a corresponding email message and further file attachments attached to the corresponding email message;
   recursively performing the selecting, determining and decomposing steps using each file attachment and further file attachment as the selected file attachment until the first email message is decomposed into the basic structure, additional basic structures and file attachments not containing further file attachments;
   calculating at the archive server a new unique identification code for each one of the file attachments not containing further file attachments;
   calculating at the archive server a hash value for each one of the file attachments with an identification code based on the content of that file attachment;
   storing the file attachments not containing further file attachments as files with respective identification codes and hash values for which no file with an identical hash value already exists in storage;
   adding at the archive server the new unique identification code and incrementing a reference counter for file attachments not containing further file attachments for whose hash value a file already exists in the storage;
   storing by the archive server the first basic structure, wherein the first basic structure is stored with references to additional basic structures for email messages attached to the first basic structure and any file attachments not containing additional file attachments attached to the first email message;
   storing by the archive server each additional basic structure with a references to additional basic structures for email messages attached to the additional email message corresponding to the email message being stored and with references to any file attachments not containing further file attachments attached to the additional email message corresponding to the additional basic structure being stored.

2. The method according to claim 1, wherein each file attachment not having further file attachments is stored as a new file, and a reference counter for the new file is initialized if no file exists for the calculated identification code.

3. The method according to claim 1, wherein the identification code is a unique hash value of information about the respective file attachment including at least temporal information.

4. The method according to claim 1, further comprising maintaining on the email server a reference file without file attachments for the first email.

5. The method according to claim 1, wherein the data contained in the first email is stored separately from the file attachments containing no further file attachments as a file with an identification code and a hash value, and the first basic structure itself contains only references.

6. The method of claim 1, further comprising:
   reading of the first basic structure of the first email message;
   retrieving from the storage those files to which the references in the first basic structure refer; and
   replacing the references by the files as the file attachments of the first email message to be reconstructed.

7. The method according to claim 6, wherein references refer to additional basic structures which, in turn, contain references, and the references are recursively replaced by corresponding files, until all the references are replaced by files.

8. The method according to claim 6, further comprising:
   receiving a call-up message for the first email message at the email server from a client;
   requesting the first email message from the archive server;
   reading the first basic structure by the archive server;
   reconstructing the first email from the basic structure;
   replacing a corresponding reference file with the reconstructed first email message on the email server; and
   sending the reconstructed first email message to the client, wherein the reconstructed first email message has an identical body and file attachments as the first email message.

9. The method according to claim 8, wherein, the email server sends an assignment code to the archive server to request the first email message.

10. The method according to claim 6, further comprising:
    determining that the first email message has been deleted;
    decrementing reference counters for file attachments not containing further file attachments that were attached to the first email message or any additional email messages.

11. The method of claim 1, further comprising storing the file attachments containing no further file attachments at a file server external to the archive server.

12. The method of claim 11, further comprising storing the first basic structure and additional basic structures at the archive server.

13. The method of claim 1, wherein the archive server receives the first email message from the email server over a network.

14. The method of claim 1, further comprising:
    storing the text body of the first email message in a separate file from the first basic structure; and storing a reference to the separate file containing the text body of the first email message in the first basic structure.

15. A computer program product comprising a non-transitory computer readable medium storing a computer program and wherein the program comprises code executable by a processor to cause an archive server to:
receive a first email message from an email server;
decompose a first email message into a first basic structure and file attachments contained in the message;
select a file attachment attached to the first email message;
determine if the selected file attachment is an additional email message containing further file attachments;
if the selected file attachment is an email message containing further file attachments, decompose the selected file attachment into an additional basic structure for a corresponding email message and further file attachments attached to the corresponding email message;
recursive perform the selecting, determining and decomposing steps using each file attachment and further file attachment as the selected file attachment until the first email message is decomposed into the first basic structure additional basic structures and file attachments not containing further file attachments;
calculate a new unique identification code for each one of the file attachments not containing further file attachments;
calculate a unique hash value for each one of the file attachments with an identification code based on the contents of the file attachment;
store the file attachments not containing further file attachments as files with respective identification codes and hash values for which no file with an identical hash value already exists in storage;
add the new unique identification code and increment a reference counter of file attachments not having further file attachments for whose hash value a file already exists in the storage;
return each identification code to the basic structure or the respective additional basic structure from which the file attachment corresponding to said identification code has been decomposed;
store the first basic structure, wherein the first basic structure is stored with references to additional basic structures for email messages attached to the first email message and any file attachments not containing further file attachments attached to the first email message; and
store each additional basic structure with references to additional basic structures for email messages attached to the additional email message corresponding to the additional basic structure being stored and with references to any file attachments not containing additional file attachments attached to the additional email message corresponding to the additional basic structure being stored.

16. A system for the storage-efficient management of electronic messages, comprising:
an archive server, comprising a first processor, a first storage, a message swapping-out module, an identification value calculation module and a reference counter management module, wherein:
the message swapping-out module, by application of the first processor:
divides a first email message that is to be managed into a first basic structure and the file attachments contained in the first email message;
selects a file attachment attached to the first email message;
determines if the selected file attachment is an additional email message containing further file attachments;
if the selected file attachment is an email message containing further file attachments, decomposes the selected file attachment into an additional basic structure for a corresponding email message and file attachments attached to the corresponding email message;
recursively performs the selecting, determining and decomposing steps using each file attachment and further file attachment as the selected file attachment until the first email message is decomposed into the first basic structure, additional basic structures and file attachments not containing further file attachments;
the identification value calculation module calculates an unique new identification code and a unique hash value for each one of the file attachments not containing further file attachments;
if the hash value has not been assigned to a file attachment already stored on the archive server, the corresponding file attachment is stored in the first storage with its identification code and hash value, otherwise, if a file having the calculated hash value already exists in the first storage, the corresponding file attachment is not stored over again, but the reference counter management module increments a reference counter of the existing file, adds the new unique identification code for the file attachment not containing further file attachments having the same hash value, and returns each unique identification code to the first basic structure or the respective additional basic structure corresponding to the email message from which the file attachment corresponding to said unique identification code has been decomposed; and
the archive server stores the first basic structure with references, wherein the references comprise references to the additional basic structures and all the identification codes returned for file attachments containing no further attachments that were attached to the first email message and stores each additional basic structure with references to file attachments containing no further file attachments that were attached to the corresponding additional email message.

17. The system according to claim 16, wherein the archive server additionally comprises a message reconstruction module which, by application of the first processor, upon a request for calling-up of the first email message, reads both the first basic structure, with references, and the files referenced in the references, from the first storage, replaces the references in the first basic structure with the files referenced by the references and stores the reconstructed first email message in the first storage or sends it to a message device.

18. The system of claim 16, further comprising an email server comprising a second processor and a second storage, wherein the email server transfers the first email message to the archive server and replaces the first email message in the second storage with a reference file having an assignment code referring to the first basic structure in the first storage.

19. The system of claim 18, further comprising an email client, comprising a third processor, a third storage, a display screen, at least one input device and a message client module, wherein a user is enabled, by means of the input device and through the message client module in combination with the third processor, to call up messages from the email server, in a user interface of the email client module on the display screen, to display said messages on the screen and store them on the archive server.

20. An archive server for the storage-efficient management of electronic messages, comprising a network interface to connect to a network, a processor, a computer readable storage medium, and a set of computer instructions stored on the computer readable storage medium and executable by the processor to cause the archive server to perform a method comprising:

decomposing a first email message into a first basic structure and file attachments attached to the first email message;

selecting a file attachment attached to the first email message;

determining if the selected file attachment is an additional email message containing further file attachments;

if the selected file attachment is an additional email message containing further file attachments, decomposing the selected file attachment into an additional basic structure for the corresponding email message and the further file attachments attached to the corresponding email message;

recursively performing the selecting, determining and decomposing steps using each file attachment and further file attachment as the selected file attachment until the first email message is decomposed into the first basic structure additional basic structures and file attachments not containing further file attachments;

calculating at the archive server a new unique identification code for each one of the file attachments not containing further file attachments;

calculating at the archive server a unique hash value for each one of the file attachments with an identification code;

storing the file attachments not containing further file attachments as files with respective identification codes and hash values for which no file with an identical hash value already exists in storage;

adding the identification code and incrementing a reference counter of file attachments not containing additional file attachments for whose hash value a file already exists in the storage;

storing by the archive server the first basic structure, wherein the first basic structure is stored with references to additional basic structures for email messages attached to the first email message and any file attachments not containing further file attachments attached to the first email message; and storing by the archive server each additional basic structure with references to additional basic structures for email messages attached to the additional email message corresponding to the additional basic structure being stored and with references to any file attachments not containing further file attachments attached to the additional email message corresponding to the additional basic structure being stored.

21. The archive server of claim 20, wherein the method performed by the archive server further comprises:

receiving a request from the email server for the first email message;

reading the first basic structure and additional basic structures;

reconstructing the first email from the first basic structure and additional basic structures; and sending the reconstructed first email to the email server, wherein the reconstructed first email has an identical body and attachments to the first email.

22. The archive server of claim 20, wherein the method performed by the archive server further comprises separately storing the file attachments containing no further file attachments in storage external to the archive server and storing the first basic structure and additional basic structures at the archive server.

* * * * *